Feb. 9, 1926.
J. F. COOPER
BALLOON
Original Filed Nov. 3, 1924
1,572,187
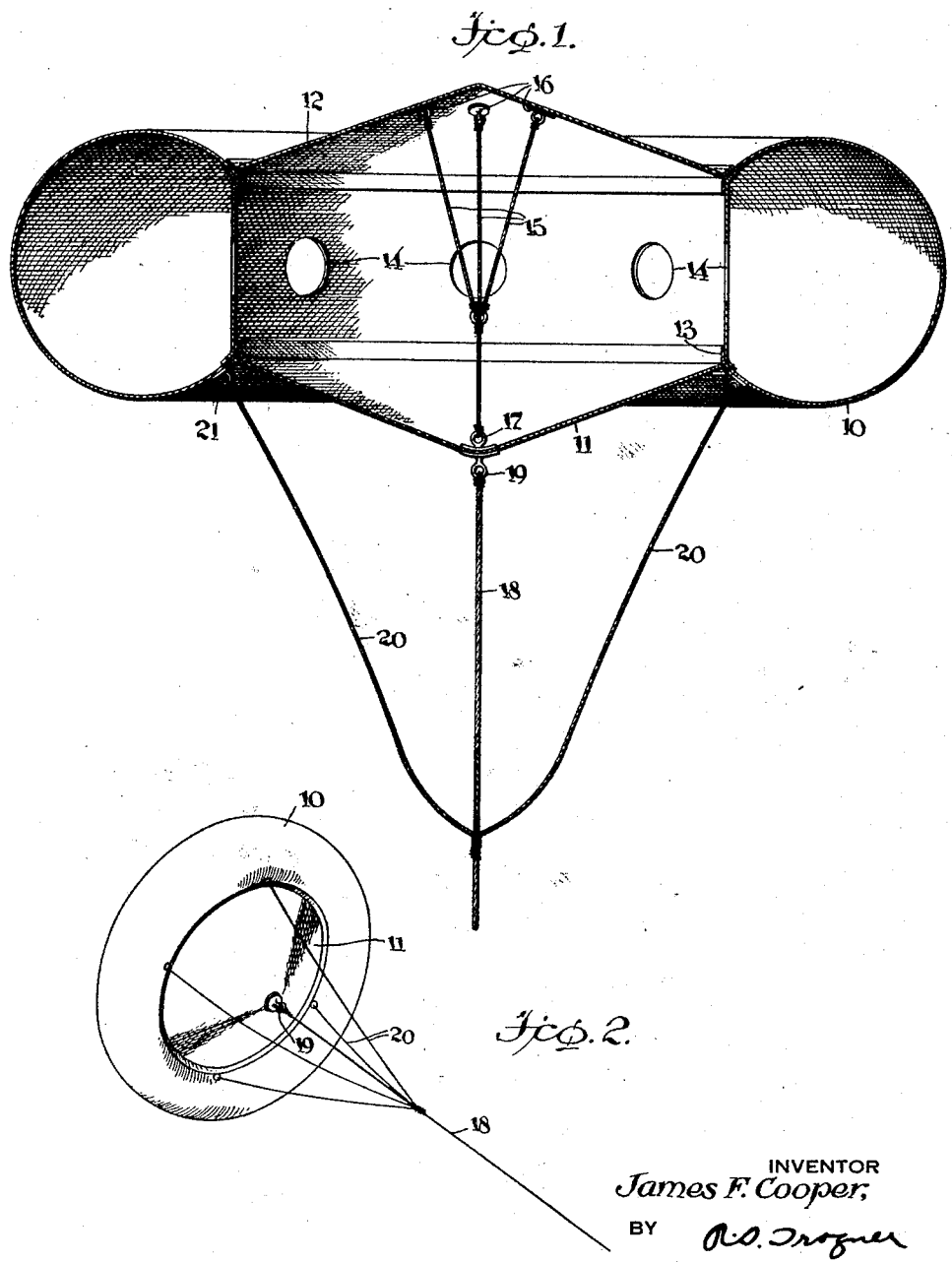
INVENTOR
James F. Cooper,
BY
ATTORNEY Patented Feb. 9, 1926.

1,572,187

UNITED STATES PATENT OFFICE.

JAMES F. COOPER, OF AKRON, OHIO, ASSIGNOR TO THE GOODYEAR TIRE & RUBBER COMPANY, OF AKRON, OHIO, A CORPORATION OF OHIO.

BALLOON.

Original application filed November 3, 1924, Serial No. 747,407. Divided and this application filed July 30, 1925. Serial No. 47,076.

*To all whom it may concern:*

Be it known that I, JAMES F. COOPER, a citizen of the United States, and resident of Akron, Ohio, have invented new and useful Improvements in Balloons, this application being a division of application Serial No. 747,407, filed November 3, 1924, of which the following is a specification.

My present invention relates to balloons, and has particular relation to the type known as captive balloons. A balloon constructed in accordance with the principles of my invention is particularly adapted for advertising purposes, that is, the balloon may be constructed in the form of the article which is to be advertised or may be painted to represent such article.

This application constitutes a division of my application Serial No. 747,407, filed November 3, 1924, for balloons.

The object of my invention consists in providing a balloon so constructed that the expansion and contraction of the gas in the balloon will not materially change the shape thereof.

Another object of my invention is to provide a balloon having means adapted to resiliently resist gas pressure within certain limits and to maintain a smooth surface over substantially the entire area of the balloon under all conditions of atmospheric temperature.

Heretofore balloons have been used for display or advertising purposes but, so far as I am aware, all prior constructions have been substantially spherical in form and none of them has been provided with means as disclosed by my invention for maintaining adequate pressure upon the inner surface of the balloon even when the gas pressure therein has reduced to a considerable extent. I have also provided novel means for suspending the balloon which assists in maintaining a constant and uniform shape of the balloon.

Reference may now be had to the accompanying drawings which form a part of this specification and of which:

Fig. 1 is a cross-sectional view of a balloon embodying the principles of my invention;

Fig. 2 is a perspective view of the structure shown in Fig. 1.

In practicing my invention, I provide an inflatable annulus 10 composed of a light weight fabric which is substantially non-permeable to air, which is substantially circular in cross-section and is similar in form to an automobile tire. Upon the inner periphery of the annulus 10 are provided two cone-shaped members 11 and 12, also composed of light weight non-permeable material, representing a disk wheel used in conjunction with the tire 10, which are secured to the annulus in any suitable manner, as indicated at 13. The connection 13 must, of course, be air-tight. The members 10, 11 and 12 constitute a container for gas and are maintained in open communication with each other by means of openings 14 in the inner wall of the annulus 10. These members may be constructed of the conventional type of balloon fabric.

It is a well known fact that when a balloon is flying and exposed to the atmosphere which changes in temperature, such changes cause considerable variation in the pressure of the gas in the balloon, causing the surface of the balloon to be stretched when the gas expands and to become slack and wrinkled when the gas contracts. In order to overcome these disadavantages, I have provided resilient means which, as indicated in Fig. 1, consist of elastic cords 15, made of rubber or other suitable material, connected between the members 11 and 12, by means of patches 16 secured to the member 12 and to an eyelet 17 provided at the apex of the cone-shaped member 11. Any convenient number of these rubber or elastic members may be used. The elastic cords or strands are normally under tension, after the balloon has been inflated with the usual amount of gas.

It will be apparent from this construction that increased pressure exerted within the balloon against the inner surfaces of the members 11 and 12 will tend to stretch the rubber cords 15. On the other hand when the temperature is lowered and the gas contracts, the rubber cords will draw the members 11 and 12 toward each other and maintain the desired pressure upon the interior surface of the balloon. Thus the surfaces of the member 11 and the annulus 10 will be kept under substantially constant pressure and the surface of the member 12 will be moved with respect to the member 11 to allow for gas contraction or expansion.

A suspension cord 18 is connected to the apex of the cone-shaped member 11 by means of a suitable eyelet 19 connected to the eyelet 17 and stabilizing suspension cords or wires 20 are connected to the member 18, and to the annulus portion of the balloon, as indicated at 21.

It will be understood, of course, that with a balloon constructed as illustrated in any of my drawings, the outer surface thereof would be painted to represent a tire tread and the side walls thereof would be provided with suitable advertising information, such, for example, as the name of the tire being advertised and the name of the manufacturer.

From the foregoing description, it will be apparent that I have provided a balloon of considerable advertising value on account of the fact that it is of the configuration of the article to be advertised. Also, it will be apparent that by means of the temperature compensating feature, a balloon constructed in accordance with my invention will present a smooth surface of the desired configuration, irrespective of the changes in temperature to which it may be subjected.

Although I have illustrated a single embodiment of my invention and described it in specific detail, it is to be understood that the disclosure is merely illustrative and is not designed to restrict the invention either in scope or spirit unless such restrictions are indicated in the claims appended hereto.

What I claim is:

1. A balloon having an annular inflatable main body portion and a circular inflatable body portion disposed within said main body portion in communication therewith.

2. A balloon of substantially circular relatively flat configuration, and resilient means incorporated therein to permit relative movement of the relatively flat side portions thereof upon changes in pressure within the balloon.

3. A balloon comprising an annular inflatable portion, a circular inflatable portion disposed within the annular portion, and a perforated partition separating the interior of the annular portion from the interior of the circular portion.

4. In a balloon comprising an annular portion, and a disk-shaped portion secured thereto, suspension lines connected to both portions and a resilient member secured within the disk-shape portion in alinement with one of the suspension lines.

5. In a balloon comprising an inflatable annular portion and a disk-shape portion secured within the annulus, suspension lines connected to both portions, and a resilient cord-member secured within the disk-shape portion substantially along the axis thereof in alinement with one of the suspension lines.

In witness whereof, I have hereunto signed my name.

JAMES F. COOPER.